United States Patent [19]

Dayton

[11] 4,056,156
[45] Nov. 1, 1977

[54] WEIGHING DEVICE

[76] Inventor: Arnold J. Dayton, 12718-37th Ave. NE., Seattle, Wash. 98125

[21] Appl. No.: 713,850

[22] Filed: Aug. 12, 1976

[51] Int. Cl.² ............................................. G01G 5/04
[52] U.S. Cl. .................................... 177/209; 73/418; 177/254
[58] Field of Search ......... 177/209, 208, 254, DIG. 7, 177/141; 73/395, 418

[56] References Cited

U.S. PATENT DOCUMENTS

| 601,339 | 3/1898 | Freeman | 177/209 |
|---|---|---|---|
| 2,294,770 | 9/1942 | Bohannan | 177/209 |
| 2,516,545 | 7/1950 | Brewster | 177/208 |
| 2,684,594 | 7/1954 | Furcini | 177/209 X |

Primary Examiner—Joseph W. Hartary

[57] ABSTRACT

Combination hydraulic-pneumatic weighting scale which has a base in which is located multiple load cell units to effect displacement of a quantity of hydraulic fluid. A flexible conduit interconnects the load cells with the gauge. The gauge indicator is moved by an air actuated Bourdon tube and can be calibrated accurately for any specific weight up to 300 pounds. There is sufficient displacement of hydraulic fluid to compress a substantial column of air in the Bourdon tube and cause deflection of the needle. The amount of air compression within the scale gauge causes a sufficiently large deflection in the Bourdon tube to effect a large needle deflection and thus to obtain weight indications over the full range of the scale with great accuracy.

17 Claims, 10 Drawing Figures

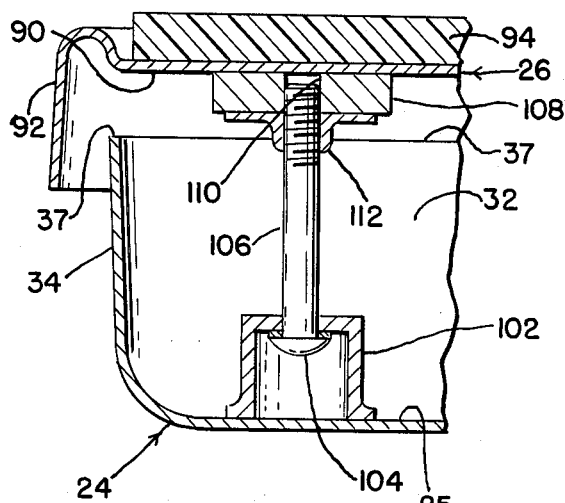
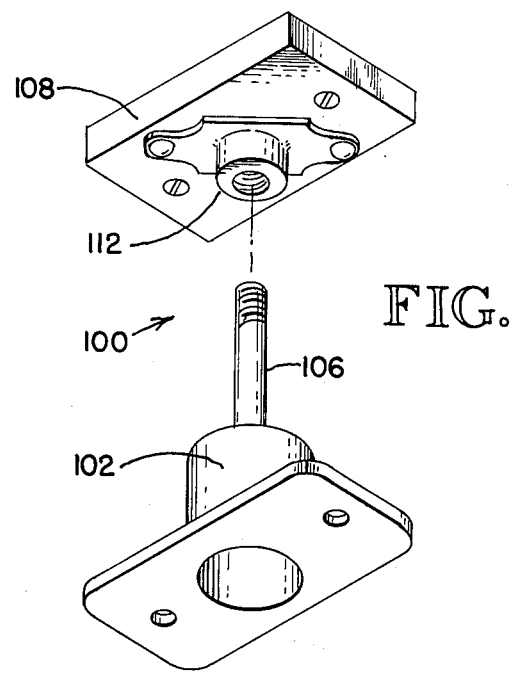
FIG. 4
FIG. 5
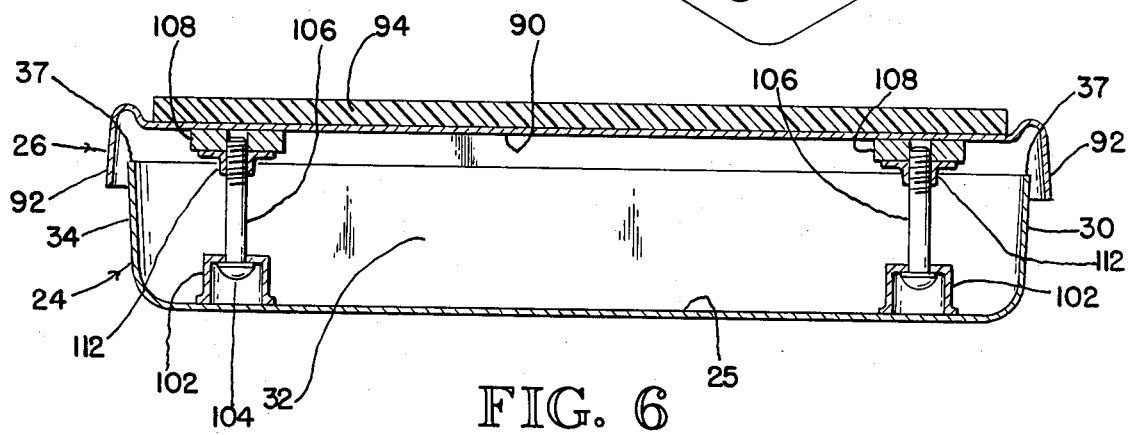
FIG. 6
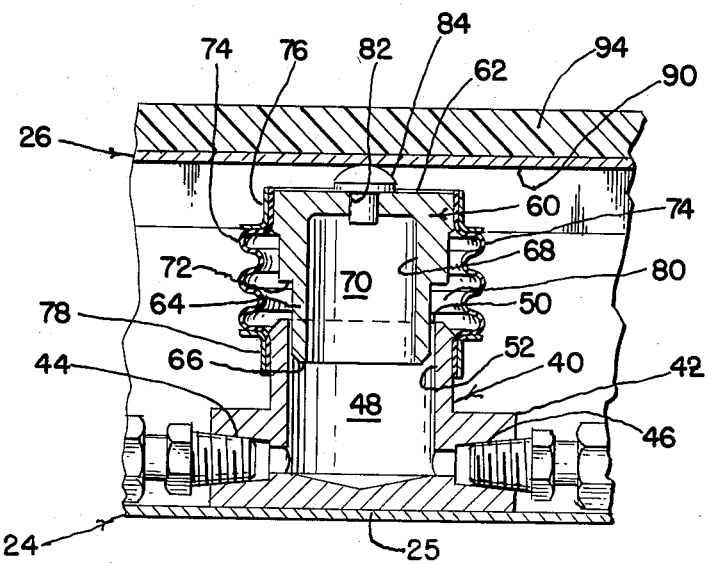
FIG. 7

10

WEIGHING DEVICE

BACKGROUND OF THE INVENTION

This invention relates to weighing scales and more particularly to a combination hydraulic-pneumatic weighing scale intended primarily for medical office and home bathroom use. As those skilled in the art are aware many types of bathroom platform scales are available over a wide range of prices. There are several types available including the mechanical fulcrum and lever types, spring type units and either air actuated or hydraulic types. Most of the scales, however, and particularly those that are of the low priced spring and lever type, involve a considerable amount of error. They contain too many parts, have too much built-in friction and they cannot be calibrated accurately except at zero weight. Purely hydraulic units have tried to do the job with one small type of load cell which requires a high pressure gauge. Thus the problem with purely hydrauic units is the high operating pressure. Additionally, they require evacuation of all air in the system to prevent bottoming of the load cell before full travel of the indicator can be effected. Where a weighting scale system involves high pressure it is susceptible to developing leaks and hence further inaccuracies. Also, single load cell weighing scales have small fluid displacement so that calibrating the indicator needle accurately to the scale is difficult if not impossible. In short, a small amount of liquid moved means high pressure and a small amount of deflection in the platform and load cell for difficult gauge calibration. Another problem is that most present bathroom scales do not distribute the load equally. Accuracy may depend upon proportional centering of the load on the platform and such equalizing of the load is not always achieved.

Patents which are of interest but not particularly pertinent to the instant invention are U.S. Pat. Nos. 2,516,545; 3,433,316; 3,637,034 and 3,765,497.

SUMMARY OF THE INVENTION

The invention is a combination hydraulic-pneumatic bathroom platform weighing device or scale which has a platform base including four load cells. The load cells are specially designed, compressible units for displacing hydraulic fluid with flexible metallic bellows. The load cells are interconnected to a line which leads to a readout scale measuring pounds of weight by a needle indicator which is actuated by displacement of a Bourdon tube. The Bourdon tube is in turn actuated by a compressible air column against which the hydraulic liquid from the load cells and the line is forced when a load is on the scales. A pair of alignment assemblies are provided between the base and the platform for holding the platform on the scale base and at the same time maintaining the platform in an aligned position.

Accordingly, it is among the objects, features and advantages of the instant invention to provide a combination hydraulic-pneumatic weighing device utilizing a multiplicity of load cells which are designed to displace as much hydraulic liquid as is necessary to compress the air column for full indicator travel. Because of the amount of hydraulic liquid displaced by the load cells, a relatively large column of air in the Bourdon tube for actuating the scale indicator can be used. The design results in low pressures in the lines of the weighing device. The scale is less susceptible to developing leaks, is inexpensive, rugged and reliable. The scales are accurate and once calibrated are not easily disturbed. The quantity of hydraulic fluid displaced is relatively large compared to other prior art devices. The air column also provides the unit with a frictionless return spring without the need for load compensation when calibrating the assembly.

BRIEF DESCRIPTION OF DRAWINGS

FIG. 4 is a partial cross section view showing the alignment assembly for the platform;

FIG. 5 is a perspective view showing further details of the alignment assembly;

FIG. 6 is a cross sectional view showing the weighing device and additional details of construction;

FIG. 7 is a cross sectional view of the load cell details; and

DESCRIPTION OF PREFERRED EMBODIMENTS

Figure 1:
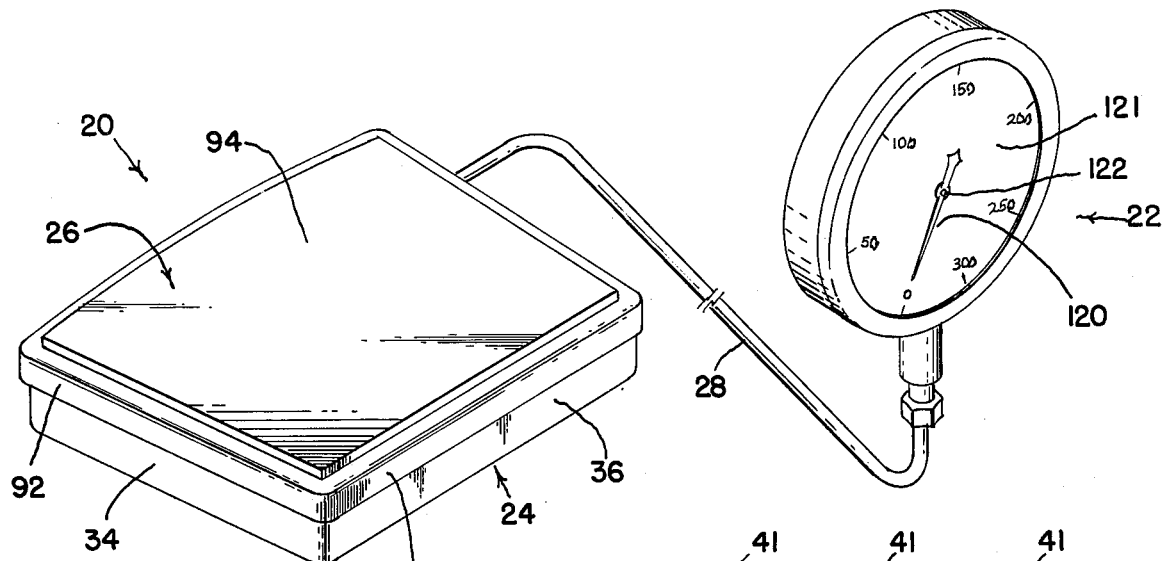
FIG. 1 shows a view in perspective as the weighing device would appear ready for use.

The scale device has the base and platform unit, generally referred to by the number 20, and the scale or gauge portion generally designated by the number 22. The scale comprises base 24 and platform 26. A hose or conduit 28 extends from the base to the scale 22.

By reference to the remainder of the drawings it will be seen that the base member 24 has bottom wall 25 and upstanding side walls, 30, 32, 34 and 36 defining an upwardly open housing somewhat rectangular in shape as shown. It will be recognized that the exterior shape could assume many configurations, including round or oval. Within housing 24 and supported on bottom 25 are four load cell units generally designated by the number 40. For the purposes of this description and because the load cells 40 are standard and uniform in construction, the single unit as shown in FIG. 7 will be described.

Load cell 40 consists of a manifold housing 42 having line connection openings 44 and 46 in the base portion thereof. Manifold 42 has fluid cavity 48 and upper end 50. Chamber 48 is connected to line openings 44 and 46 and has interior wall surface 52. An upper movable member generally designated by the number 60 is in this embodiment generally shaped in the form of an inverted cup. It contains upper or closed end wall 62, side wall 64 and has lower edge 66 with interior wall surface 68 defining piston cavity 70. The outside of wall 64 has a radially outwardly offset or annular stop surface 72 which acts as a limit to the distance which movable member 60 may depress into the manifold cavity 48. It will be noted that the outside diameter of the wall 64 clears the inside wall 52 of the housing sufficiently to permit liquid to pass between the outside of the movable member and the upper end of the housing. Secured to both the manifold and the movable member is a flexible metallic bellows 74 with an unspecified number of convolutions. It is secured generally at the upper end of the movable member and to the upper end of the manifold by furnace brazing or fusion welding. Each end of bellows 74 has a ring 76 and 78 fastened to it by roll seam welding and is used to prevent ballooning of the bellows axially when load is applied. An annular cavity 80 is defined between the inside of the bellows and member 60. On the closed end of the piston is an opening 82 having a plug 84. It will be understood that when the load cell 40 is filled with hydraulic liquid the cavities 48,70 and 80 are completely filled, and that to provide for proper functioning all air bubbles or pockets will have been removed through the opening 82 before installing plug 84.

Platform member 26 has generally flat wall or surface 90 with depending edge or skirt 92 which, as can be seen in FIG. 6, extends downwardly on the outside below the upper edge 37 of the base. An appropriate decorative pad 94 is applied to the top of the platform wall 90.

As can best be seen in FIGS. 4, 5 and 6, appropriate alignment assemblies generally designated by the number 100 are provided to keep the platform aligned on the base and to restrict the amount of upward movement of the platform. The alignment assemblies comprise guide socket 102 which extends upwardly into the base a predetermined distance to accommodate the head 104 of bolt 106. An opening is provided in the sockets 102 so that the shank 106 of the bolt may pass through. The upper end of the sockets, of course, act as an abutment surface for the head. On the under side of platform member 90 are spacer blocks 108 with openings 110 therein. On the underside of block 108 and shaped to threadably receive bolts 106 are elastic plate nuts 112. Downward motion of the platform 26 is limited by the load cells while upward movement and maintenance of alignment is determined by the alignment assemblies 100.

Figure 2:
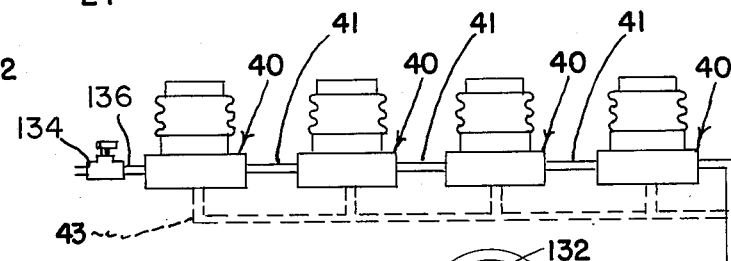
FIG. 2 is a schematic view indicating that the load cells may be connected either in series or in parallel for displacement of hydraulic fluid.
Figure 3:
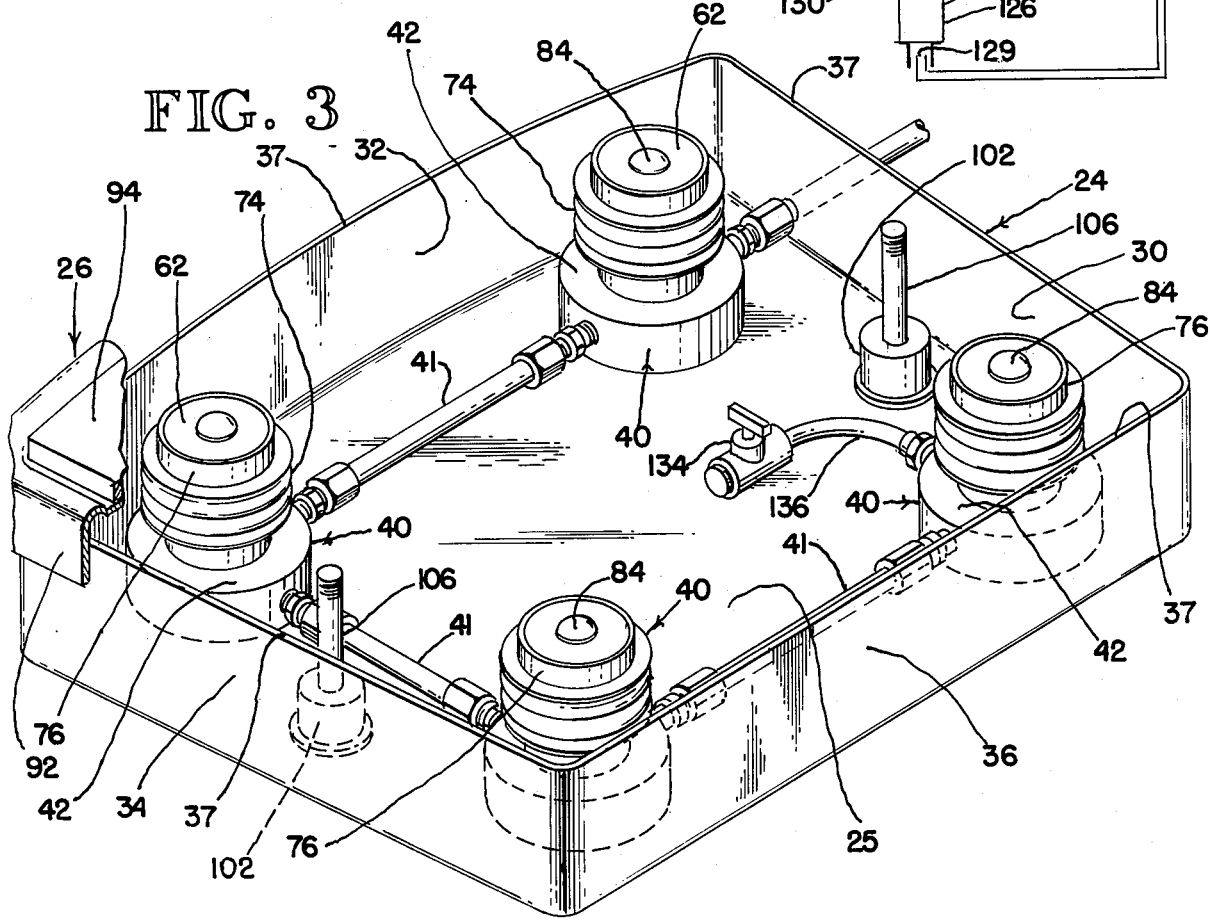
FIG. 3 is a perspective view with the platform removed showing details of construction of the weighing device.

The scale or indicator unit 22 has a needle 120 mounted on a shaft 122. Needle 120 and shaft 122 are actuated by a Bourdon gauge or tube having hollow tube 124 connected to fitting 126. Inside and as part of the Bourdon tube is the mechanism for translating motion of the tip 125 of the tube into rotary motion of the needle. The mechanism consists of link 128 connected to gear segment 130 which engages the pinion 132 on needle shaft 122. It is to be noted that this invention does not include the elements of the Bourdon tube per se except insofar as it is a preferred form of device for utilizing a compressible column of air. Fluid from the load cells 40 is cumulatively displaced through interconnecting load cell lines 41 into outside line 28 leading to the gauge 22. Hydraulic fluid is part of the system in the line 28 up to fitting 126 as at the end 129 of line 28. The Bourdon tube 124 is filled with air. As a load is received on the platform the pistons of the four load cells are depressed into their housings moving fluid into line 28 and into the Bourdon tube and thus compressing the air column in tube 124. The use of four load cells gives a predetermined hydraulic liquid displacement for sufficient compression of the air column to result in deflection of the tube. The tube deflection results in full indicator needle deflection for maximum design weight indication. It will be appreciated, reference being had to FIG. 7, that the depressable portion of the load cell can only be forced into the manifold to the point where stop surface 64 engages the upper edge 50 of the manifold. While a series arrangement of load cells has been shown, a parallel arrangement as shown in dotted lines 43 in FIG. 2 may also be employed. The primary and important factor is the large volume liquid displacement to obtain sufficient compression of the air in Bourdon tube 124 to give full needle deflections and therefore maximum weight readings on the scale 121. The system can be filled with the required amount of hydraulic liquid through valve 134 and line 136 as illustrated in FIG. 3.

Figure 8:
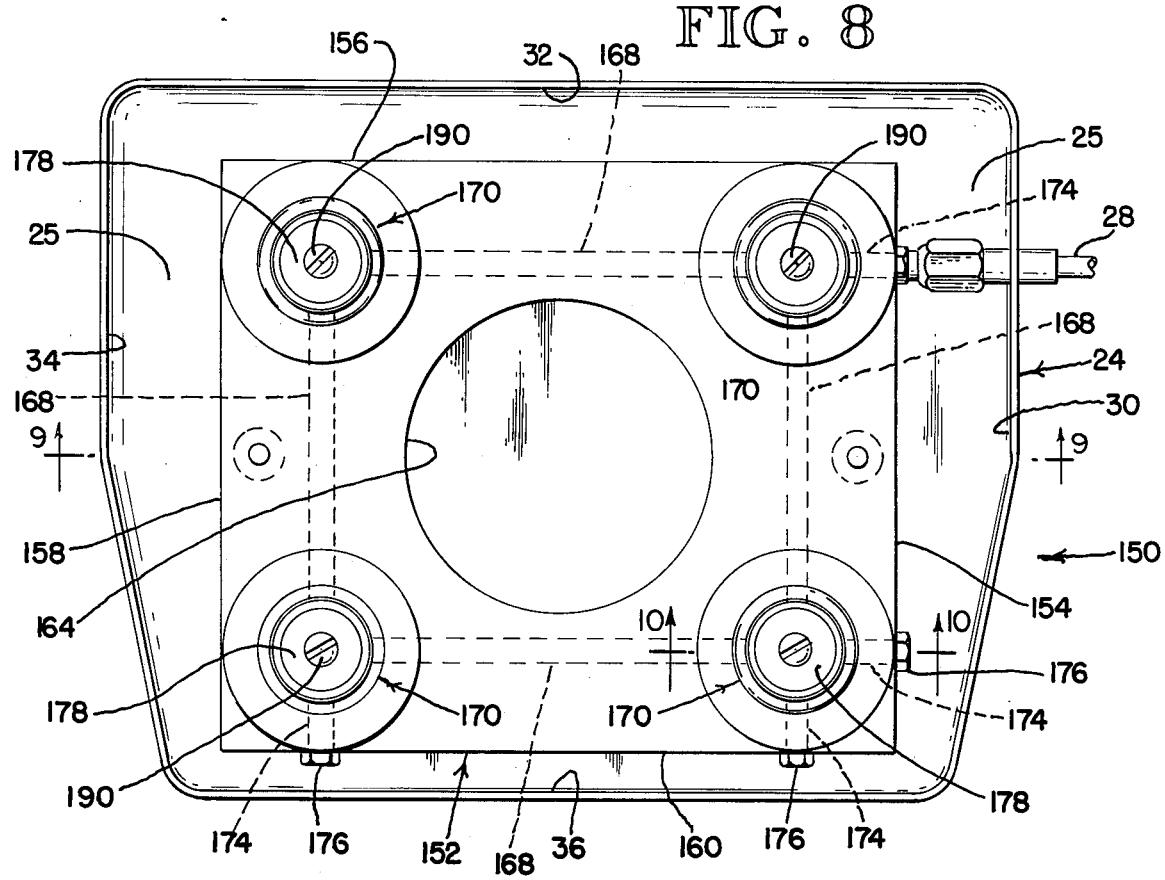
FIGS. 8–10 show various details of construction of an alternative embodiment.
Figure 9:
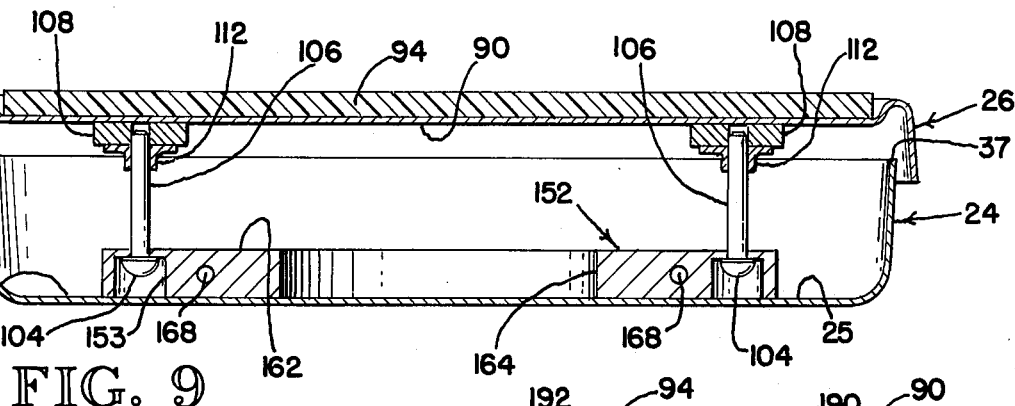
Figure 10:
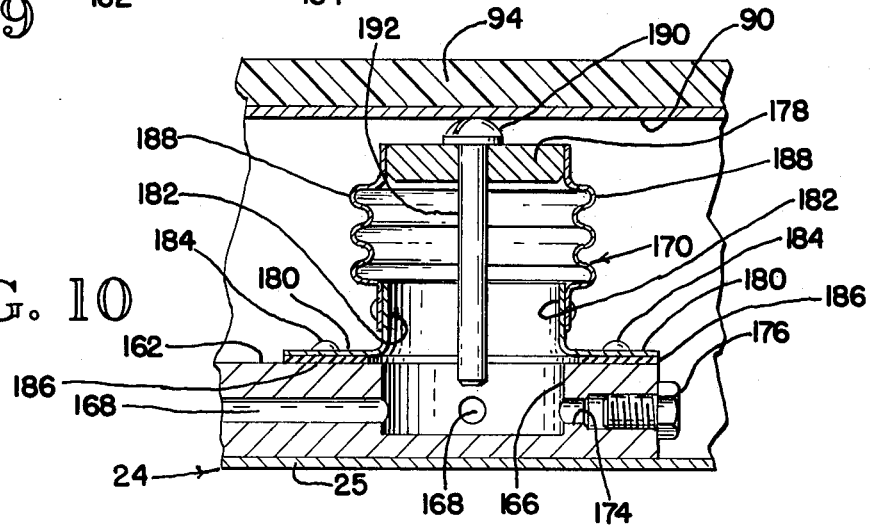

The embodiment as shown in FIGS. 8-10 represents another manner of construction of the invention. Those parts of the scale device, generally designated by the number 150, which are not changed will bear the same numbers as the first embodiment. Parts which are changed will be designated with different numbers.

A manifold number, designated genrally as number 152, is a generally rectangular metallic or plastic plate member having wide edges 154, 156, 158 and 160, and top surface 162. To reduce weight the center section is removed as at 164. Load cells 170 are disposed as shown generally at the four corners of the manifold. The manifold includes upwardly open load cell cavities 166 for each of the load cell structures which will be described in greater detail hereinafter. Passages 168 interconnect the cavities 166. Since the design of the manifold is such that the passages 168 are drilled or reamed, entrance openings 174 from the wide edges of the manifold are provided and sealed with threaded plugs 176.

Load cells 170 are constructed as shown in FIG. 10. A downwardly depressable top member 178 forms the upper end of the load cells. Located on the upper surface 162 of the manifold around the edge of cavity 166 is a corrosion resistant steel flange member having upstanding annular wall 182 and the horizontal anchoring portion 180 by which the flange is secured to the manifold as with rivets 184 or other means. Gasket 186 is disposed between anchoring portion 180 and the manifold to seal against leaks. Metallic bellows 188 interconnects annular wall 18 and top member 178. The bellows may be attached to the top member and flange by brazing or fusion weld. The platform assembly 26 bears on head 190 of bolt 192 which extends through a central opening in top member 178. While it is not shown, the shank of the bolt may be threaded and the lower end of the bolt is spaced a predetermined distance above the bottom of cavity 168 in order to stop the downward travel when it reaches its maximum desired movement. The bolt obviously allows for adjustment and calibration of the individual load cell and the amount of hydraulic fluid that will be displaced when a load is applied. It will be noted also that manifold 152 includes sockets 153 for the heads 104 of alignment bolts 106.

What is claimed is:

1. A combination hydraulic-pneumatic weighing device comprising:
   a. a base member including a bottom wall and upstanding side walls defining an upwardly open scale housing,
   b. a plurality of hydraulic fluid-containing, load-receiving members supported in said base member, said load receiving members having a manifold housing including an upwardly open manifold cavity and a downwardly movable member disposed above said manifold cavity for limited vertical movement and also including a metallic bellows member sealingly secured to both said movable member and manifold housing and together with said manifold cavity defining a load cell cavity, said manifold housing including at least one fluid opening connected to said manifold cavity to be interconnected by fluid passage means with another load receiving member, said plurality of load-receiving members being filled with hydraulic liquid and interconnected for movement of said hydraulic liquid, c. a platform section mounted on said base member in such a way as to apply a weight thereon generally equally to said plurality of load-receiving members, d. conduit means interconnecting at least one of said load-receiving members and a weighing scale device and also being substantially completely filled with hydraulic liquid, said conduit and said plurality of load-receiving members being interconnected so as to cumulatively displace a predetermined amount of hydraulic liquid in response to a predetermined amount of weight being applied to said load receiving member, and, e. said weighing scale device including a weight indicator which is actuated by a column of air compressed by said displaced hydraulic liquid.

2. The weighing device according to claim 1, and in which a hydraulic liquid fill passage is connected to at least one of said load-receiving members, said fill passage being sealed from leakage by removable plug means.

3. The weighing device according to claim 2 and in which said load-receiving members include means for limiting the amount of downward travel of said movable member.

4. The weighing device of claim 3 and in which said weighing scale device is actuated by a Bourdon tube containing air, said tube being deflected when the air therein is compressed by movement of hydraulic liquid out of said load-receiving members, into said conduit and into said tube.

5. The weighing device according to claim 1 and in which four of said load-receiving members are located within said base member and operatively interconnected to conjointly displace hydraulic liquid into said conduit.

6. The weighing device according to claim 5 and in which said platform section bears upon the movable portion of said platform section bears upon the movable portion of said load-receiving members for depressing the same downwardly toward said housing portion to force hydraulic liquid through said conduit against said column of air to compress the same.

7. The weighing device according to claim 6 and in which alignment and retainer means interconnect said base members and platform section for holding said platform section in aligned and vertically movable relationship with said base member.

8. The weighing device according to claim 7 and in which said alignment and retainer means comprise a pair of socket means in said base in which is received a bolt head, said socket means having an upwardly facing opening through which the bolt body is slideably received in adjustment nutplate means affixed to the underside of said platform section.

9. A combination hydraulic-pneumatic weighing device, comprising:

a. a base member including a bottom wall and upstanding side walls defining an upwardly open scale housing, b. a plurality of hydraulic fluid-containing, load-receiving members supported in said base member, said load-receiving members having a manifold housing including an upwardly open manifold cavity and a downwardly movable member disposed above said manifold cavity for limited vertical movement and also including an upstanding annular wall means extending upwardly from around said manifold cavity, a metallic bellows member sealingly secured to both said movable member and to said annular wall and together with said manifold cavity defining a load cell cavity, said housing portion including at least one fluid opening connected to said manifold cavity to be interconnected by fluid passage means with another load-receiving member, said plurality of load-receiving members being filled with hydraulic liquid and interconnected for movement of said hydraulic liquid, c. a platform section mounted on said base member in such a way as to apply a weight thereon generally equally to said plurality of load-receiving members.

d. conduit means interconnecting at least one of said load-receiving members and a weighing scale device and also being substantially completely filled with hydraulic liquid, said conduit and said plurality of load-receiving members being interconnected so as to cumulatively displace a predetermined amount of hydraulic liquid in response to a predetermined amount of weight being applied to said load-receiving member, and e. said weighing scale device including a weight indicator which is actuated by a column of air compressed by said displaced hydraulic liquid.

10. The weighing device according to claim 9 and in which said load-receiving members are interconnected in series.

11. The weighing device according to claim 9 and in which said load-receiving members are interconnected in parallel to a common line which is connected to said conduit.

12. The weighing device according to claim 10, and in which fill passage means are connected to at least one of said load-receiving members.

13. The weighing device of claim 12 and in which said weighing scale device is actuated by a Bourdon tube containing air, said tube being deflected when the air therein is compressed by movement of hydraulic liquid out of said load-receiving members, into said conduit and into said tube.

14. The weighing device according to claim 9 and in which four of said load-receiving members are located within said base member and operatively interconnected to conjointly displace hydraulic liquid into said conduit.

15. The weighing device according to claim 14 and in which said platform section bears upon the piston section of said load-receiving members for depressing the same downwardly into said housing portion to force hydraulic liquid through said conduit against said column of air to compress the same.

16. The weighing device according to claim 15 and in which alignment and retainer means interconnect said base member and platform section for holding said platform section in aligned and vertically movable relationship with said base member.

17. The weighing device according to claim 16 and in which said alignment and retainer means comprise a pair of socket means in said base in which is received a bolt head, said socket means having an upwardly facing opening through which the bolt body is slideably received, the outer end of said bolt body being threadably received in adjustment nutplate means affixed to the under side of said platform section.

* * * * *